United States Patent [19]

Horner et al.

[11] Patent Number: 5,485,312
[45] Date of Patent: Jan. 16, 1996

[54] OPTICAL PATTERN RECOGNITION SYSTEM AND METHOD FOR VERIFYING THE AUTHENTICITY OF A PERSON, PRODUCT OR THING

[75] Inventors: Joseph L. Horner, Belmont, Mass.; Bahram Javidi, Storrs, Conn.; John F. Walkup, Lubbock, Tex.

[73] Assignee: The United States of America as represented by the Secretary of the Air Force, Washington, D.C.

[21] Appl. No.: 127,651

[22] Filed: Sep. 14, 1993

[51] Int. Cl.⁶ .......................... G02B 27/46; G06K 9/76; G06K 9/74
[52] U.S. Cl. .......................... 359/561; 359/29; 359/559; 359/560; 382/210; 382/280; 356/71
[58] Field of Search .......................... 359/29, 559, 560, 359/561, 569; 382/31, 43; 356/71

[56] References Cited

U.S. PATENT DOCUMENTS

| | | | |
|---|---|---|---|
| 3,995,948 | 12/1976 | Abe et al. | 359/29 |
| 4,588,260 | 5/1986 | Horner | 359/29 |
| 4,765,714 | 8/1988 | Horner et al. | 359/561 |
| 4,786,124 | 11/1988 | Stone et al. | 356/345 X |
| 4,866,699 | 9/1989 | Brackett et al. | 359/115 X |
| 4,876,725 | 10/1989 | Tomko | 382/4 |
| 5,040,140 | 8/1991 | Horner | 364/822 |
| 5,050,220 | 9/1991 | Marsh et al. | 382/4 |
| 5,085,957 | 2/1992 | Hosono | 420/5 |
| 5,109,427 | 4/1992 | Yang | 382/4 |
| 5,111,515 | 5/1992 | Javidi | 382/43 |
| 5,119,443 | 6/1992 | Javidi et al. | 382/42 |
| 5,148,316 | 9/1992 | Horner et al. | 359/561 |
| 5,216,541 | 6/1993 | Takesue et al. | 359/561 |
| 5,257,322 | 10/1993 | Matsuoka et al. | 382/31 |
| 5,262,893 | 11/1993 | Shrauger et al. | 359/565 |
| 5,309,523 | 5/1994 | Iwaki et al. | 382/42 |
| 5,323,472 | 6/1994 | Falk | 382/31 |
| 5,361,222 | 11/1994 | Khoury et al. | 365/49 |
| 5,367,579 | 11/1994 | Javidi et al. | 382/31 |

Primary Examiner—Brian Healy
Attorney, Agent, or Firm—Robert L. Nathans; Stanton E. Collier

[57] ABSTRACT

A method of verifying the authenticity of an object is disclosed preferrably employing a joint transform coherent optical processor. An unreadable and hence non-counterfeitable phase mask is coupled to the object and the optical processor compares the phase mask with a reference phase mask having the same phase code thereon. The processor produces a correlation spot having an intensity which exceeds a given level if the phase mask is genuine. A highly secure ID or credit card also carries a fingerprint bonded to the phase mask, and the fingerprint on the card is compared to a reference fingerprint of the card holder for added security.

23 Claims, 2 Drawing Sheets

OPTICAL PATTERN RECOGNITION SYSTEM AND METHOD FOR VERIFYING THE AUTHENTICITY OF A PERSON, PRODUCT OR THING

STATEMENT OF GOVERNMENT INTEREST

The invention described herein may be manufactured and used by or for the Government for governmental purposes without the payment of any royalty thereon.

BACKGROUND OF THE INVENTION

Credit card fraud is a serious problem facing many banks, businesses, and consumers. This invention aims at securing credit cards, passports, high security IDs, and other IDs so that they cannot be reproduced. In addition, counterfeit parts such as computer chips, machine tools, etc. are arriving on our shores in great numbers. Recently a news item revealed that a ATM machine had been rigged to read conventional bank cards and decipher their PIN (personal identification number). A simple, duplication proof means is urgently required to verify authenticity in such cases.

With the rapid advances in computers, CCD technology, image processing hardware and software printers, scanners, and copiers, it is becoming very easy to reproduce pictures, logos, symbols, or patterns. Presently, credit cards and passports use holograms for security. The holograms are inspected by human eye. In theory, the hologram can not be reproduced by an unauthorized person using commercially available optical components. As a matter of fact, the holographic pattern can be easily acquired from a credit card (photographed or captured by a CCD camera) and then a new hologram synthesized by a computer. It can then be written onto an optical film or etched onto a surface to generate the holographic image. Therefore, any pattern that can be read by a conventional light source and a CCD camera can be easily reproduced.

BRIEF SUMMARY OF THE INVENTION

Invisible patterns that cannot be seen and cannot be copied by a detector such as the CCD camera are utilized for verification of the authenticity of items bearing the pattern. The pattern consists of a two-dimensional phase mask with up to several millions of pixels or higher and it is not holographic. The large dimensions of the mask make it extremely difficult (if not impossible) to guess the contents of the mask. The nature of this mask is known only to the authorized producer of the card. The phase nature of the mask makes it invisible to any conventional intensity detector such as a CCD camera. This includes the human eye. For example, one cannot analyze the mask by looking at the card under a microscope or photographing it, or reading it with a computer scanner in an attempt to reproduce it.

The phase mask can be used alone. For example it can be affixed to a product such as a designer handbag or a computer chip and read by Fourier transform correlators or processors to verify authenticity. Or the mask can be bonded to another image such as a fingerprint or a picture of a person, and used on an ID or credit card. It can not be removed without destroying the phase mask and/or the underlying image, which destruction can be verified visually. In the preferred embodiment, the phase mask and an image of a corresponding reference phase mask are illuminated by coherent light in the input plane of a joint transform correlator (JTC) and the joint power spectrum (JPS) of the two images is inverse Fourier transformed to produce a correlation spot. If the phase mask is genuine, the intensity of the correlation spot will exceed a predetermined intensity level to produce a verification output signal.

BRIEF DESCRIPTION OF THE DRAWINGS

The various features of the invention will become more apparent upon study of the following description taken in conjunction with the drawings in which.

DETAILED DESCRIPTION OF EMBODIMENTS OF THE INVENTION

Let us assume that a random function $M(x,y)$ is used for the phase mask. An intensity sensitive detector will not be able to detect this phase-encoded pattern. With the high resolution of the commercially available optical films and materials, $M(x,y)$ can be of the order of a million pixels, and yet the mask size will be only a few square millimeters. The mask is attached to the object to be protected and will operate in either the transmissive or reflective mode. The mask can be sandwiched between two layers of durable transparent optical films which are filled with a liquid to compensate for the phase non-uniformities of the optical materials, that is, a so-called liquid gate.

Methods of making the mask are known to workers in the art; see U.S. Pat. No. 4,588,260 to Horner. As explained in col. 6 and 7, the mathematical phase information, which can be an array of numbers, is converted into an intensity modulated beam which in turn controls the index of refraction at each pixel of the photographic receptor sheet which is developed by a bleaching procedure into the phase mask. These changes in the index of refraction result in phase changes of the wavefront passing through the phase mask. U.S. Pat. Nos. 4,765,714 and 4,588,260 to Horner et al, also describe frequency plane correlators utilizing the phase-only filters. A variety of other techniques can be used to synthesize the phase masks. The masks can be fabricated by embossing thin materials, which can be multilayered, and are called pure phase material, such material being marketed by Polaroid and DuPont. Techniques such as those used to make refractive/binary optical elements can also be employed. These techniques can also be combined to make the masks.

Figure 1:
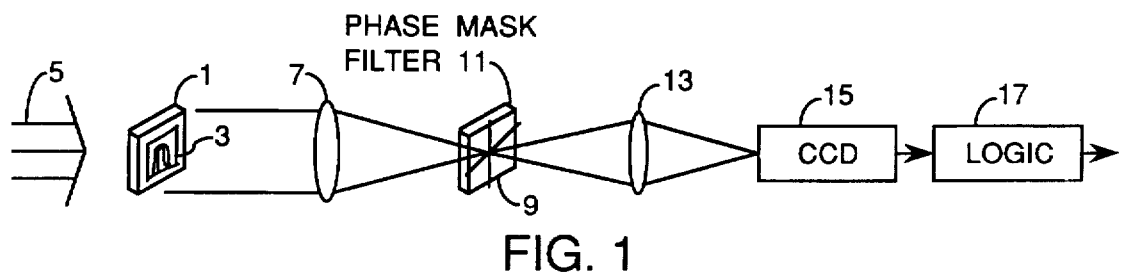
FIG. 1 discloses phase mask verification using a 4F frequency plane correlator.

The verification machine that reads the card is a coherent optical processor, such as shown in FIG. 1. In this embodiment, the machine has an a-priori knowledge of the mask, and uses a reference phase filter 11 which could be a matched filter or a phase-only filter or a binary phase-only filter or other types made from $M(x,y)$ in a frequency-plane correlator to inspect the phase mask and verify its authenticity. The filter 11 of FIG. 1 is placed in the Fourier transform plane 9 of the processor and has the form {FT[exp(jM(x,y))]}* if it is the classical matched filter.

Here, FT is the Fourier transform operation, and * is complex conjugation. The system will compute the correlation function between the input mask and the reference mask to validate the input. If we are using a pseudo-random function for M(x,y), in the output or correlation plane a well defined bright spot of light, in fact the well known Dirac delta function, is produced for an authorized mask, and a low intensity signal is produced for a mismatch.

Figure 2:
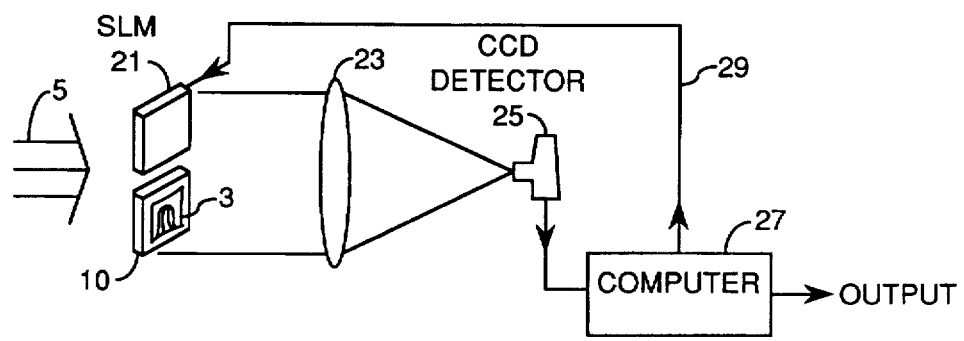
FIG. 2 discloses a JTC correlator for verifying a fingerprint match in addition to verifying the authenticity of the phase mask superposed over the fingerprint on an ID or credit card.

In FIG. 1, an object 1 whose authenticity is to be verified has a phase mask 3 affixed thereto. Laser light 5 can illuminate the phase mask 3 by reflection or can be transmitted through a transparent portion of object 1 which could be a plastic tag or planar member coupled to a designer handbag for example. A phase mask spatial filter 11 is positioned in the Fourier plane 9 of the 4F or frequency plane correlator well known to workers in the art. The phase mask spatial filter could be a classical matched filter but is preferrably a phase-only filter such as a binary phase-only filter. The image of phase mask 3 is Fourier transformed by lens 7 and the Fourier transform is multiplied with the signal of the spatial filter 11 and inverse Fourier transform lens 13 produces the correlation spot at the input plane of CCD image sensor 15. If the spatial filter 11 matches or has a high degree of correlation with phase mask 3, a high intensity spot will be detected by the CCD sensor and if the intensity thereof exceeds a predetermined level, logic circuit 17 will produce a authenticity verification signal at its output. If the phase mask 3 is a counterfeit, the intensity of the correlation spot will be far below the threshold established by logic circuit 17. See U.S. Pat. No. 4,588,260 to Horner for further details regarding the nature of this frequency plane correlator. The nature of both this frequency plane correlator and the joint transform correlator (JTC) of FIG. 2, are well known to workers in the art.

Thus the phase mask can also be described as a seal for verifying the authenticity of an object to which the seal is applied. In another embodiment, shown in FIG. 2, the Joint Transform Correlator (JTC) architecture is used to verify the authenticity of the card. We presently prefer the single SLM version of the JTC disclosed in U.S. Pat. No. 5,040,140 to Horner and Javidi, and incorporated by reference herein, because it is probably the most practical and cost-effective type for this application. Of course, this does not guard against stolen cards, and a user personal identification number (PIN) could still be encoded somewhere on the card.

A fingerprint or photograph of the person's face could also be put on the card to verify the user. For complete security, both the phase mask and personal identification means suggested above would be included. In the JTC correlator shown in FIG. 2, the phase mask from the card 10 forms one half of the input signal.

The other half of the input plane could be occupied by a spatial light modulator 21 (SLM) on which is written in real time a version of the same phase code from computer memory, or another card could be inserted containing the authorized phase mask. This would provide the flexibility of allowing a "code of the day" or whatever time interval is appropriate. It would correlate with a selected portion of the phase mask M(x,y) 3 bonded to the card. In either case both signals are placed in the input plane of the JTC. This makes it very easy to rapidly update or change the master code, or to write an individual code quickly. The JTC correlator is probably the preferred correlator for use in practising the invention since the alignment of the filter in the Fourier plane of the frequency plane correlator, FIG. 1, is extremely critical. However, the filter 11 can rapidly dither in the Y direction, and be slowly moved in the X direction to "find" the exact alignment as indicated by the presence of a high intensity correlation spot. Methods of electronically dithering image pixels for other purposes are well known in the art and thus further details have been omitted herein. The phase mask can be represented mathematically by the function $exp[j\Theta(x,y)]$ where $\Theta(x,y)$ is related to the phase mask function as $\Theta=exp(j\pi M(x,y))$ when $M(x,y)$ is a real function normalized to maximum values of $\pm 1.0$. Let us assume that the photograph or pattern to be inspected is denoted by the function $g(x,y)$. The machine that reads the card is the coherent optical processor of FIG. 1 or 2. The machine has an a prior knowledge of the mask $exp[j\Theta(x,y)]$, and uses a matched filter or a JTC, as discussed Fourier plane and uses a matched filter or a JTC as discussed above, to verify the mask or the image under it. If a matched filter is used, $FT[exp(j\Theta(x,y))]*$ is placed in the Fourier plane and it will produce the correlation function in the output plane of the processor. This correlation function is a measure of the match between the input and the reference mask. If we are using a pseudo-random function or a function with high frequencies, a well defined correlation is produced for an authorized mask, and a low signal is produced for a mismatch. See for example the article by, J. Walkup et al., APPLIED OPTICS, vol. 16, pp. 3131, 1977).

Note that the input to the processor is $g(x,y)exp[j\Theta(x,y)]$, but the filter can be made to match $exp[-j\Theta(x,y)]$. The phase mask $exp[j\Theta(x,y)]$ is designed to have spatial frequencies higher than the spatial frequencies of the image such as a FP pattern positioned under the phase mask. As a result, the matched filter $FT[exp(j\Theta(x,y))]*$ will detect only the phase mask portion of the composite signal $f(x,y)exp[j\Theta(x,y)]$. Other types of filters can be designed to detect $g(x,y)$ out of the composite signal $g(x,y)exp[j\Theta(x,y)]$. As an additional security test, the intensity of the input, that is, $|g[x,y)exp[j\Theta(x,y)]|^2=|g(x,y)|^2$ can be inspected visually by, for example, a security guard. We have verified these assertions with computer simulations. (A paper on these simulations will be given at the S.P.I.E. conference in Orlando Fla., Apr. 8, 1994).

VERIFYING THE AUTHENTICITY OF AN OBJECT BY PLACING THE MASK ON A FINGERPRINT, PHOTOGRAPH OR OTHER NON-DUPLICATABLE PATTERN

Figure 3:
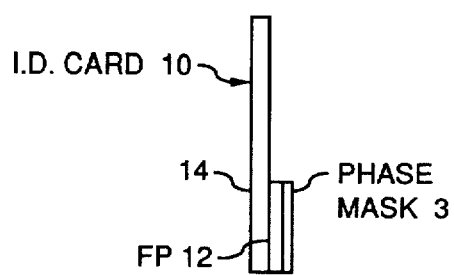
FIG. 3 illustrates a portion of the ID card inserted into the correlator of FIG. 2.

Our preferred embodiment of FIG. 2, utilizes the aforesaid prior art JTC disclosed in U.S. Pat. No. 5,040,140 issued to Horner and Javidi and incorporated by reference herein. While fingerprint matching is described for verification of an ID card, it should be understood that other non-transferrable biometric signatures in the form of images such as photos, palm prints, voiceprints, and eye retinas can be matched. In this embodiment, an identification card or planar member 10 of FIG. 3 is positioned in the input plane of the JTC. Coherent light 5 from a laser diode passes through a transparent portion 14 of the card and passes through the card holders fingerprint (FP) 12 and through phase mask 3. The phase mask can be a thin sheet of transparent plastic bonded to the FP with a strong bonding agent which will cause the phase mask to be destroyed upon separation of the phase mask from the card in an attempt to tamper with the card by substituting a new FP in place of the old one or to reuse the phase mask on another counterfeit card.

Figure 4:
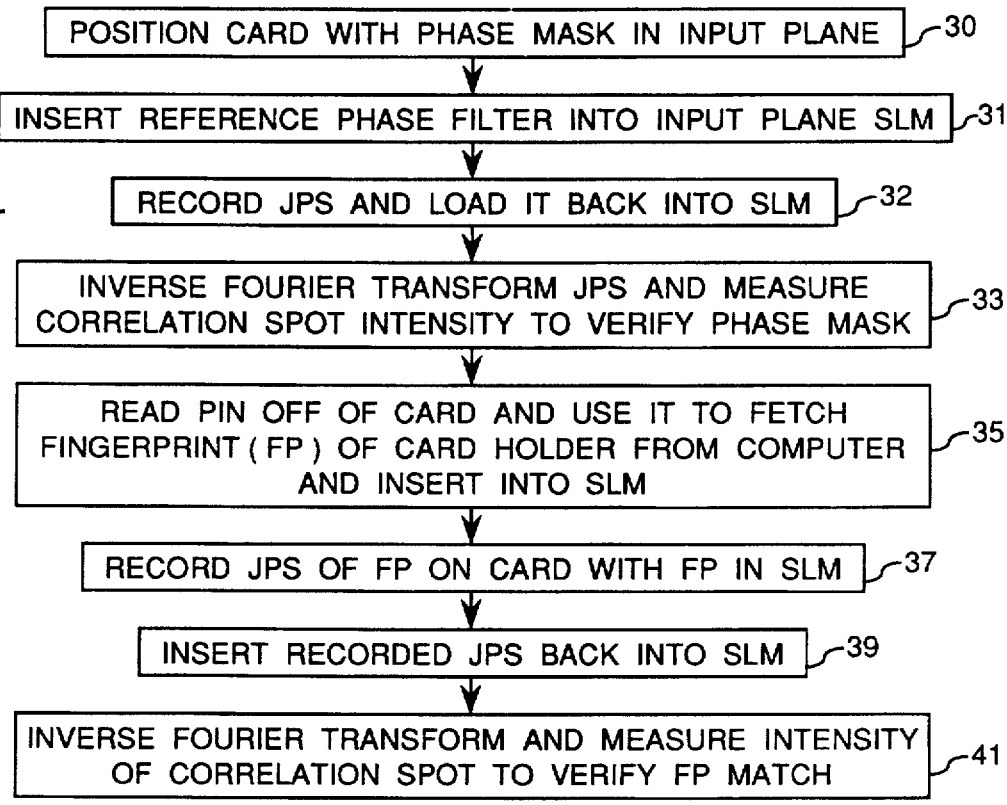
FIG. 4 illustrates a flow chart illustrating the method steps carried out by the correlator of FIG. 2.

A flow chart describing exemplary steps, within the blocks, which may be carried out by the JTC of FIG. 2, is illustrated in FIG. 4. The steps may be interchanged in time in a number of ways that are obvious; eg the FP 12 can be verified before the phase mask 3 on the card is verified. The card 10 of FIG. 3 is positioned in the input plane (block 30). The corresponding reference phase filter is fetched from computer 27 and written into SLM 21 (block 31). Fourier transform lens 23 generates the joint power spectrum (JPS) of the two phase mask images, which JPS is recorded by CCD image sensor 25 and is now inserted into the SLM via lead 29 (block 32). Lens 23 produces the inverse Fourier transform and the resulting correlation spot is detected by CCD image sensor 25 (block 33). The intensity of the spot determines the degree of correlation between the two phase mask signals to verify the authenticity of the phase mask 3 in the manner previously described in connection with the CCD sensor 15 and logic circuit 17 of FIG. 1.

The FP of the card holder can be verified as follows. A unique personal identification number (PIN) on the card may be used to fetch the card holder's FP image from computer storage and which is written into SLM 21 (block 35). The FP 12 on the card is now correlated with the FP image now in the SLM 21. The resulting joint power spectrum (JPS) produced by Fourier transform lens 23 is recorded by CCD image sensor 25 and written into SLM 21 in place of the FP image retrieved from computer storage (blocks 37 and 39) Lens 23 inverse Fourier transforms the JPS and the intensity of the resulting correlation spot is measured as before to determine whether a close match between FP images is produced (block 41) thereby to verify a FP match. In the single SLM embodiment illustrated in FIG. 2, the SLM 21 is off axis. It may be desirable to mechanically shift its position to position it on axis just before the JPS is inserted therein (block 39) so that the carrier frequency of the JPS does not exceed the resolution of the CCD detector.

Figure 5:
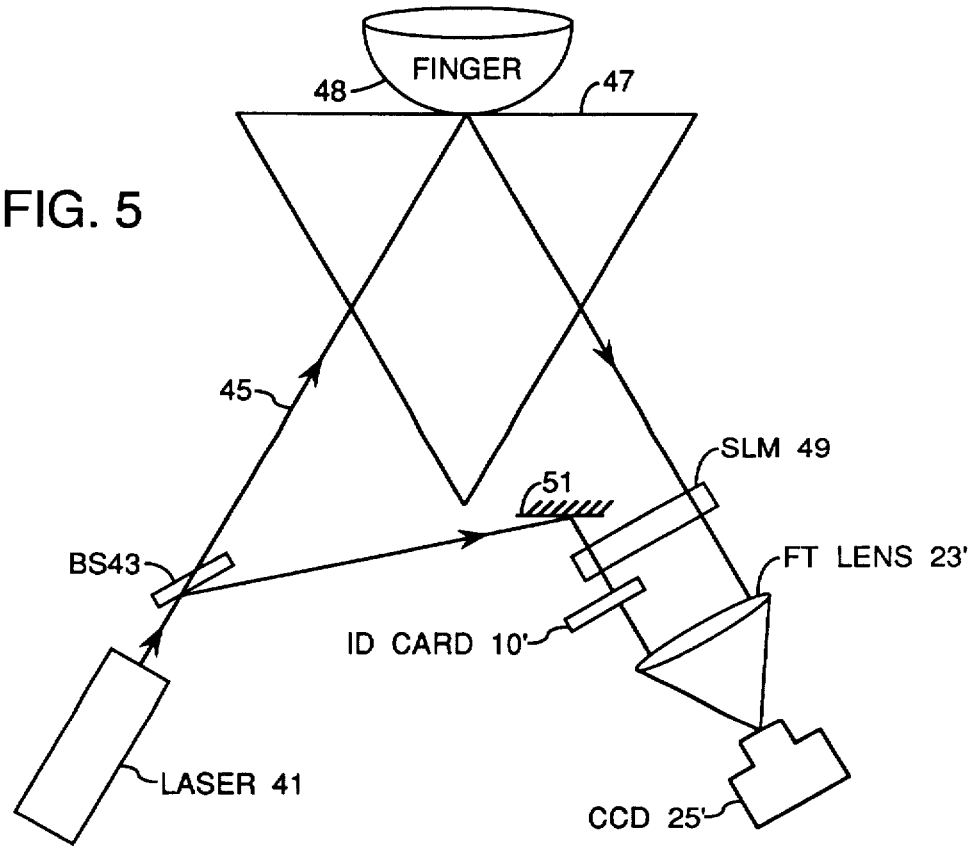
FIG. 5 illustrates a JTC somewhat similar to the embodiment of FIG. 2 for comparing a live fingerprint of the card holder with the fingerprint image on his ID card.

FIG. 5 illustrates a verifier essentially similar to the embodiment of FIG. 2 except that a currently produced biometric signature pattern such as a live FP of a person seeking access to a facility is compared to the card holder's biometric signature reference pattern which could be his FP image on the ID card 10' corresponding to the card of FIG. 3. The reference phase mask is inserted into SLM 49 and the phase mask on the card 10' is verified as before. Note that laser diode 41 directs a coherent beam at prism 47 via beam splitter 43. The FP image of the live FP at 48 is now correlated with the card FP image as discussed in connection with FIGS. 2–4. The use of a prism as shown to cause a FP to modulate a light beam is well known in the art of FP matching. See for example U.S. Pat. No. 3,716,301 to Caulfield et al. Note that the ID card 10' is illuminated by coherent light via beam splitter 43 and mirror 51. During comparison of the live and reference FPs, the SLM 49 is programmed so that all light incident thereon passes through the SLM. As in FIG. 2, the JPS is inserted back into the SLM for the inverse Fourier transform step performed by lens 23' to produce the correlation spot. The JPS occupies the central portion of the SLM so that it is on the optical axis. In another embodiment of the invention not shown, using the JTC, the phase mask from the ID card and the reference phase mask, which can be physically placed in the input plane in place of an SLM, are compared. The JPS is generated using an intensity sensitive detector such as the aforesaid CCD. However, the Fourier transformation of the JPS can be done electronically by means of a fast Fourier transform chip for example. This embodiment may be slower than an all optical system, but could be less expensive to manufacture. Also, the JPS can be nonlinearly transformed or binarized before the Fourier transformation is applied. This is similar to binary joint transform correlation described in U.S. Pat. Nos. 4,832,447 to Javidi. and 5,040,140 to Horner and Javidi. Thus, if the reference phase mask is on a transparent card in the input plane along with the ID card 10 of FIG. 3, the need for an SLM is eliminated and the correlator can be built very inexpensively.

For even more security, the FP pattern could itself be phase encoded and overlayed with the random phase-mask. That is, a fingerprint or picture of a face could be written as a phase mask itself and bonded with the random phase mask discussed previously. This would have the effect that the combined pattern would be completely invisible to the eye or to any other detector using conventional light sources. The fingerprint mask could be produced by the same means used to make the random phase mask, e.g., embossing techniques. For example, the values of the fingerprint would probably be binarized first and converted to ones and zeros. When a one occurs, the embossing transducer presses into the plastic mask just deep enough so that when the mask is illuminated with laser light, the depression shifts the phase of the light by typically 180 degrees. Those places in the binarized fingerprint image where there is a zero, no impression would be made, and hence the illuminating laser light would be shifted by zero degrees relative to those pixels shifted by 180 degrees. The embossing transducer works much like the conventional dot matrix printer used with computers. This technique would have an additional security value, in that anyone wanting to counterfeit the card, would not even be able to easily determine what type of an image they would have to produce on the card. Furthermore, with proper design, they would not even be able to tell where on the card the array would be located.

In some applications it may be desirable to write the phase pattern on materials with limited life or decay time so that the phase pattern would disappear in a specific length of time. This could be useful for products that should be sold by a given date and would guard against theft. For example, a liquid crystal material operates by an electric field applied to the crystal. If the field is stored on a capacitor connected to a shunt resistor, the lifetime of the pattern written on the crystal would be depend on the time constant of the RC circuit. Adjusting the resistance could vary the decay time of the pattern stored on the crystal. This could have such applications to such things as medical supplies and food items. In other words, this embodiment makes it possible to accurately verify the authenticity or shelf-life of a product. A different version of this idea is a leaky mirror placed behind the phase mask operating in reflective mode. The leakage could increase with time to the point that the after a given length of time, the mirror either completely absorbs the light or becomes transmissive.

Another method of verifying the authenticity of the phase mask is by interferometry. In the JTC configurations of FIG. 2 and 5, an interference pattern between the input mask and the reference mask can be generated. Inspecting the resulting fringe patterns can verify the authenticity of the phase mask. If the two masks are identical, a uniform one-dimensional fine grating is produced. Various image processing devices, well known to workers in the field, could be used to detect and identify this fringe pattern directly.

In conclusion, we propose a phase-encoding scheme that is virtually impossible to copy, and when combined with a PIN or individual fingerprint or photograph, makes a foolproof security entry or identification system.

Since variations in the aforesaid description will be apparent to workers in the art, the scope of the invention is to be limited only by the terms of the following claims and art recognized equivalents thereof. For example, the term "phase mask" includes light transmissive embossed or etched arrays or light reflective embossed or etched arrays which could be configured as a metal reflector. This term connotes a substantial number of phase modulating pixels to yield the requisite security, in contrast with an ordinary phase retarding plate. Also, the random phase modulating phase mask need not overlay the biometric signature but could be positioned alongside it on the card. In fact, the random phase mask can even be omitted and the biometric signature can be converted into a single phase mask and be bonded to the ID card or equivalents to a card such as a plastic key having an IC circuit therein for granting access. The term "facility" includes any device such as an ATM machine or computer, and is thus not to be limited to a storage or work area.

What is claimed is:

1. A method of verifying the authenticity of an object comprising the steps of:
   (a) associating an object related phase mask having invisible phase encoding thereon with said object; and
   (b) comparing said object related phase mask with a reference phase mask in a coherent optical processor, said reference phase mask having a high degree of phase correlation with respect to said object related phase mask.

2. The method of claim 1 wherein step (b) is carried out in a joint Fourier transform correlator.

3. The method of claim 1 wherein step (b) is carried out in a Fourier transform frequency plane correlator.

4. The method of claim 1 wherein step (a) is carried out by coupling said object related phase mask to said object.

5. Method of verifying the authenticity of an object comprising the steps of:
   (a) coupling a phase mask to said object;
   (b) providing a joint transform coherent optical correlator having an image input plane;
   (c) inserting a first image of said phase mask having a given phase code and a second image of a reference phase mask having said given phase code into the image input plane of said joint transform coherent optical correlator;
   (d) producing a correlation signal indicating the degree of match between the first and second image; and
   (e) producing a positive verification signal in response to the production of a close match signal during the execution of step (d).

6. Method of verifying the authenticity of an object comprising the steps of:
   (a) coupling a phase mask to said object;
   (b) providing a frequency plane Fourier transform optical correlator having an optical axis and a Fourier plane intersecting said optical axis;
   (c) inserting an image of said phase mask having a given phase code into the input plane of said frequency plane correlator and inserting a matched phase mask spatial filter into the Fourier plane of said optical correlator;
   (d) producing a correlation signal indicating the degree of match between the image of the phase mask and the spatial filter; and
   (e) producing a positive verification signal in response to the production of a close match signal during the execution of step (d).

7. The method of claim 6 wherein said matched phase mask spatial filter is a phase-only filter.

8. The method of claim 6 further including the step of causing the matched filter to dither in two dimensions about said optical axis to eliminate any adverse effect due to misalignment of the center of the matched filter with respect to said optical axis.

9. A method of controlling access to a facility comprising the steps of:
   (a) superposing a phase mask over a biometric signature reference pattern on an identification means of a person seeking access to said facility;
   (b) comparing a currently produced biometric signature pattern of said person seeking access with said biometric signature reference pattern on said identification means; and
   (c) upon the production of a positive match resulting from carrying out step (b), granting said person access to said facility.

10. The method of claim 9 wherein said phase mask is compared with a reference phase mask in a coherent optical correlator to verify the authenticity of the phase mask.

11. The method of claim 9 wherein said phase mask is bonded to said reference pattern by a bonding agent which destroys said phase mask upon an attempted separation of said phase mask from said reference pattern.

12. The method of claim 10 wherein said phase mask is bonded to said reference pattern by a bonding agent which destroys said phase mask upon an attempted separation of said phase mask from said reference pattern.

13. Method of verifying the authenticity of an object comprising the steps of:
   (a) coupling a phase mask, having an invisible phase encoded pattern thereon, to said object;
   (b) providing a joint transform coherent optical correlator having an image input portion;
   (c) inserting a first image of said phase mask having a first particular phase code and a second image of a reference phase mask having a particular reference phase code that matches said first particular phase code into the input image portion of said joint transform coherent optical correlator; and
   (d) inspecting the resulting interference pattern between the first image and the second image to verify the authenticity of the phase mask coupled to said object.

14. An authenticity verification method comprising the steps of:
   (a) providing a planar identification member; and
   (b) affixing a seal to said planar identification member for verifying the authenticity of said planar identification member, and seal comprising a light phase modulating phase mask having an invisible phase encoded pattern thereon.

15. A method of verifying the authenticity of an object comprising the steps of:
   (a) providing a seal for verifying the authenticity of an object to which said seal is applied, said seal comprising a light phase modulating phase mask;
   (b) coupling said seal to said object;
   (c) illuminating said seal with coherent light to produce a first image;
   (d) providing a second image consisting of a reference phase-only image having a phase matching the phase of said phase mask;
   (e) comparing said first and second images; and
   (f) generating a verification signal upon the production of a close match produced upon the execution of step (e).

16. Method of verifying the authenticity of a biometric signature and a phase mask positioned on a card comprising the steps of:
   (a) positioning the card having the phase mask and the biometric signature of a cardholder thereon in an input portion of a joint transform correlator (JTC);
   (b) inserting a reference phase mask phase matched with respect to said phase mask on the card into said input portion;
   (c) recording the joint power spectrum (JPS) produced by Fourier transforming images of said phase mask and said reference phase mask;
   (d) inverse Fourier transforming the JPS produced in accordance with step (c) and measuring the intensity of the resulting correlation spot to determine the authenticity of the phase mask on the card;
   (e) inserting a biometric reference signature of the cardholder into said input portion of said JTC corresponding to the biometric signature on the card;
   (f) recording the joint power spectrum (JPS) produced by Fourier transforming images of said biometric reference signature of the cardholder and the biometric signature on the card;
   (g) inverse Fourier transforming the JPS produced in accordance with step (f) and measuring the intensity of the resulting correlation spot to determine the authenticity of the biometric signature on the card.

17. Apparatus for verifying the authenticity of an object having a phase mask coupled thereto comprising:
   (a) means for inputting a coherent optical representation of said phase mask coupled to said object into a coherent optical processor, said coherent optical processor including comparator means for comparing said representation of said phase mask with a reference phase mask; and
   (b) means for producing a positive authentication signal in response to a close phase match condition sensed by said comparator means.

18. The apparatus of claim 17 wherein said coherent optical processor is a joint Fourier transform correlator.

19. The apparatus of claim 17 wherein said coherent optical processor is a Fourier transform frequency plane correlator.

20. Method of verifying the authenticity of a representation of a biometric signature and a phase mask both coupled to an identification device comprising the steps of:
   (a) converting said biometric signature into a first phase mask;
   (b) bonding a second phase mask to said first phase mask to form a composite phase mask coupled to said identification device;
   (c) utilizing a coherent optical correlator to compare said composite phase mask to a reference mask phase matched with said composite mask; and
   (d) generating a positive authenticity verification signal in response to a close match condition produced in the execution of step (c).

21. Method of verifying the authenticity of a representation of a biometric signature coupled to an identification device comprising the steps of:
   (a) converting a biometric signature of a holder of said identification device into a biometric signature phase mask;
   (b) coupling said biometric signature phase mask to said identification device;
   (c) utilizing a coherent optical correlator to compare said biometric signature phase mask produced in accordance with step (a) to a reference biometric signature phase mask phase matched with respect to said biometric signature phase mask; and
   (d) generating a positive authenticity verification signal in response to a close match condition produced during the execution of step (c).

22. The method of claim 21 further including the step of bonding an additional phase mask to said biometric signature phase mask.

23. A method for verifying the authenticity of an object comprising coupling a seal to said object, said seal having a invisible phase encoded pattern thereon.

* * * * *